United States Patent [19]
Orr

[11] Patent Number: 5,894,810
[45] Date of Patent: Apr. 20, 1999

[54] PERSONAL WATERCRAFT HAVING A HOOD ASSEMBLY WITH A BASE PIECE FOR MOUNTING A STEREO SYSTEM

[76] Inventor: John D. Orr, 922 W. Rainbow Falls Way, Orange, Calif. 92865

[21] Appl. No.: 09/064,377

[22] Filed: Apr. 22, 1998

[51] Int. Cl.[6] ................................................ B63B 17/00
[52] U.S. Cl. ........................................... 114/343; 114/270
[58] Field of Search ........................... D12/317; 114/343, 114/361, 270, 364

[56] References Cited

U.S. PATENT DOCUMENTS

| | | |
|---|---|---|
| D. 376,150 | 12/1996 | Pesce . |
| 4,445,228 | 4/1984 | Bruni . |
| 4,473,251 | 9/1984 | Murayama . |
| 4,706,810 | 11/1987 | Petrilli . |
| 4,771,722 | 9/1988 | Tihany . |
| 4,957,056 | 9/1990 | Martin ................................ 114/343 |
| 4,986,208 | 1/1991 | Kobayashi ........................... 114/270 |
| 5,001,779 | 3/1991 | Eggert et al. . |
| 5,076,191 | 12/1991 | Madore . |
| 5,584,733 | 12/1996 | Kobayashi . |

*Primary Examiner*—Ed L. Swinehart
*Attorney, Agent, or Firm*—Ira S. Dorman

[57] ABSTRACT

The base piece of a hood assembly for a personal water-craft mounts the components of an audio system in a watertight environment while, at the same time, affording ready access to its operating and functional features.

20 Claims, 6 Drawing Sheets

PERSONAL WATERCRAFT HAVING A HOOD ASSEMBLY WITH A BASE PIECE FOR MOUNTING A STEREO SYSTEM

BACKGROUND OF THE INVENTION

It is known in the art to incorporate a stereo speaker assembly into a contempory form of personal watercraft (PWC), as indicated by Pesce U.S. Des. Pat. No. 376,150. Tihany U.S. Pat. No. 4,771,722 provides means for carrying a portable radio/cassette player unit on the back of a watercraft seat, and Petrilli U.S. Pat. No. 4,706,810 provides a removable console system, for small boats, in which electronic instruments can be transported and positioned for convenient monitoring.

U.S. Pat. No. 5,076,191, to Madore, and U.S. Pat. No. 5,584,733, to Kobayashi, show that it is conventional to construct the hull of a PWC with a covered storage compartment; Kobayashi discloses that the hull provides areas for locating various components for the watercraft. Structures for installing stereo audio systems into motorcycles are disclosed in U.S. Pat. No. 4,445,228, to Bruni, U.S. Pat. No. 4,473,251, to Murayama, and U.S. Pat. No. 5,001,779, to Eggert et al.

SUMMARY OF THE INVENTION

A need exists for means by which an audio system, and in particular a stereo system, can be effectively and conveniently installed in a personal watercraft so as to enable the rider to listen to music or other programs while the PWC is in operation. Accordingly, the broad objects of the present invention are to provide such means and to provide a PWC incorporating the same.

More specific objects of the invention are to provide a hood assembly, and an inner base piece comprising the assembly, for the containment of an audio system on-board a PWC, which assembly (and, in particular, the base piece) provides a water-tight environment for the audio system while also providing easy access to its operating controls and functional elements, and optimal positioning of loudspeakers.

Further objects of the invention are to provide a hood assembly and a PWC having the foregoing features and advantages, wherein the hood assembly maintains the aesthetic attributes of the unmodified front hood of the PWC, and wherein convenient placement of gages is afforded.

It has now been found that certain of the foregoing and related objects of the invention are attained by the provision of a hood assembly for a personal watercraft. The hood assembly is constructed for attachment to the PWC hull with its rearward end portion proximate the rider's location for movement between a lowered position, in closing relationship overlying the storage compartment, and a raised position spaced upwardly away from the compartment. Structure for supporting an electronic component of an on-board audio system is provided on the underside of the hood assembly, with the audio component being so positioned as to lie in communication with the storage compartment, and preferably to reside at least partially therewithin, when the hood assembly is in its lowered position, and being so oriented as to cause its function face to be directed toward the rider's location for ready access when the hood assembly is in its open position.

To produce these relationships the structure for supporting will preferably be so constructed as to orient the audio component with its function face directed downwardly into the storage compartment in the lowered hood assembly position, and directed generally rearwardly toward the rider's location in the raised position. More specifically, the structure for supporting will desirably be such that an axis of the supported audio component, lying generally normal to its function face, will extend at an oblique angle to a longitudinal axis of the hood assembly.

The hood assembly will most advantageously include a remote control component constructed for operative connection to the audio component, disposed on its rearward end portion for ready access to the rider when the hood assembly is in its lowered position. The hood assembly will normally comprise an outer shell piece assembled with a unique inner base piece, the latter providing the underlying structure by which the audio component is supported. The hood assembly will usually include at least one speaker mount on its rearward end portion, and preferably at least one additional such speaker mount will be provided, the mounts being disposed on opposite lateral sides of the hood assembly for stereophonic sound production.

Other objects of the invention are attained by the provision of a personal watercraft into which a hood assembly, as herein described, is incorporated. Further objects are attained by the provision of a inner base piece comprising the audio component-support structure and being so constructed as to enable assembly with an outer shell piece, the base piece and the shell piece together providing a hood assembly embodying the invention. Structure of the inner base piece will normally impart the desired orientation to the supported audio component, and will also provide a water-tight chamber in which the component is contained.

DETAILED DESCRIPTION OF THE PREFERRED AND ILLUSTRATED EMBODIMENTS

Turning now in detail to the appended drawings, therein illustrated is a PWC embodying the present invention and consisting of a hull, generally designated by the numeral 10, having an upper body portion 12, on which is provided a seat or saddle 13 for the rider, and a steering handle 14 that projects rearwardly into proximity to the seat 13. A hood assembly, generally designated by the numeral 16, is attached to the upper body portion 12 of the hull 10 by a hinge 18, and is constructed and positioned to overlie the upwardly opening storage compartment 20, which is formed into the body portion 12 forwardly of the rider's location. A gasket 34 extends about the periphery of the panel 26 (more fully described below), to form a seal against the surface of the hull body 12 surrounding the compartment 20, and a hasp 46 may be provided to coact with a latching mechanism (not shown) for securing the hood assembly in its closed position.

Figure 3A:
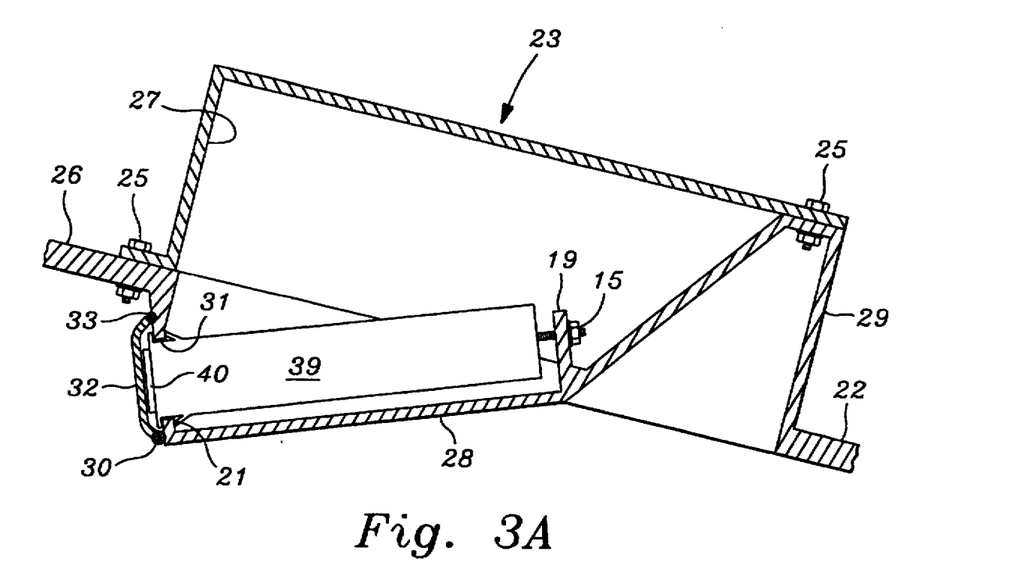
FIGS. 3A and 3B are fragmentary sectional views, taken along line 3 of FIG. 2, drawn to a further enlarged scale and showing, respectively, the electronic component of the audio system fully contained within, and partially withdrawn from, the water-tight compartment that is provided by the supporting structure of the inner base piece.
Figure 3B:
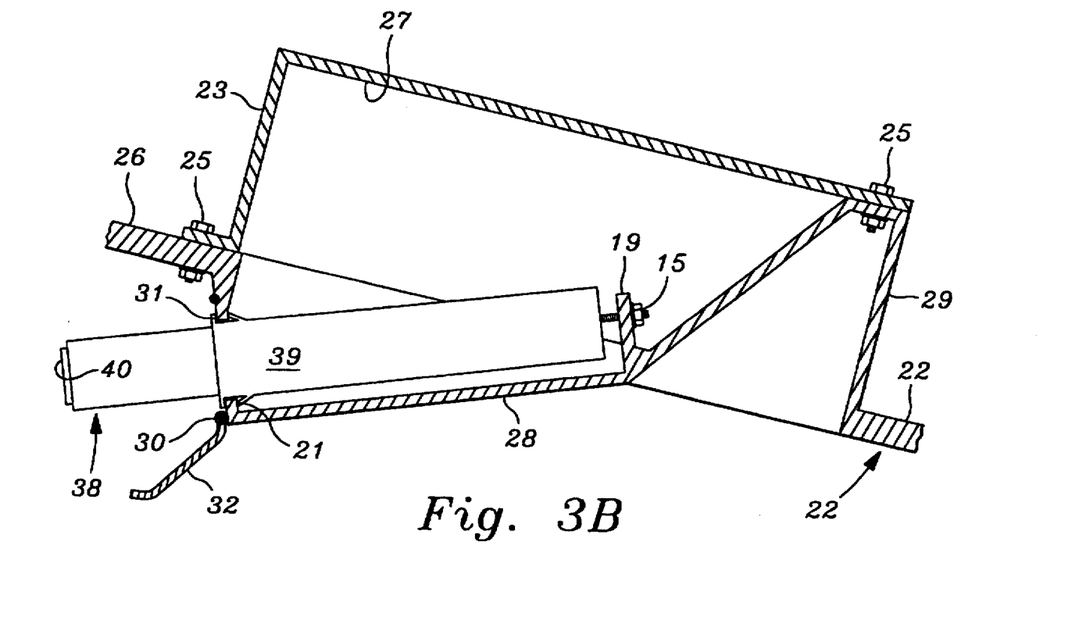
Figure 4:
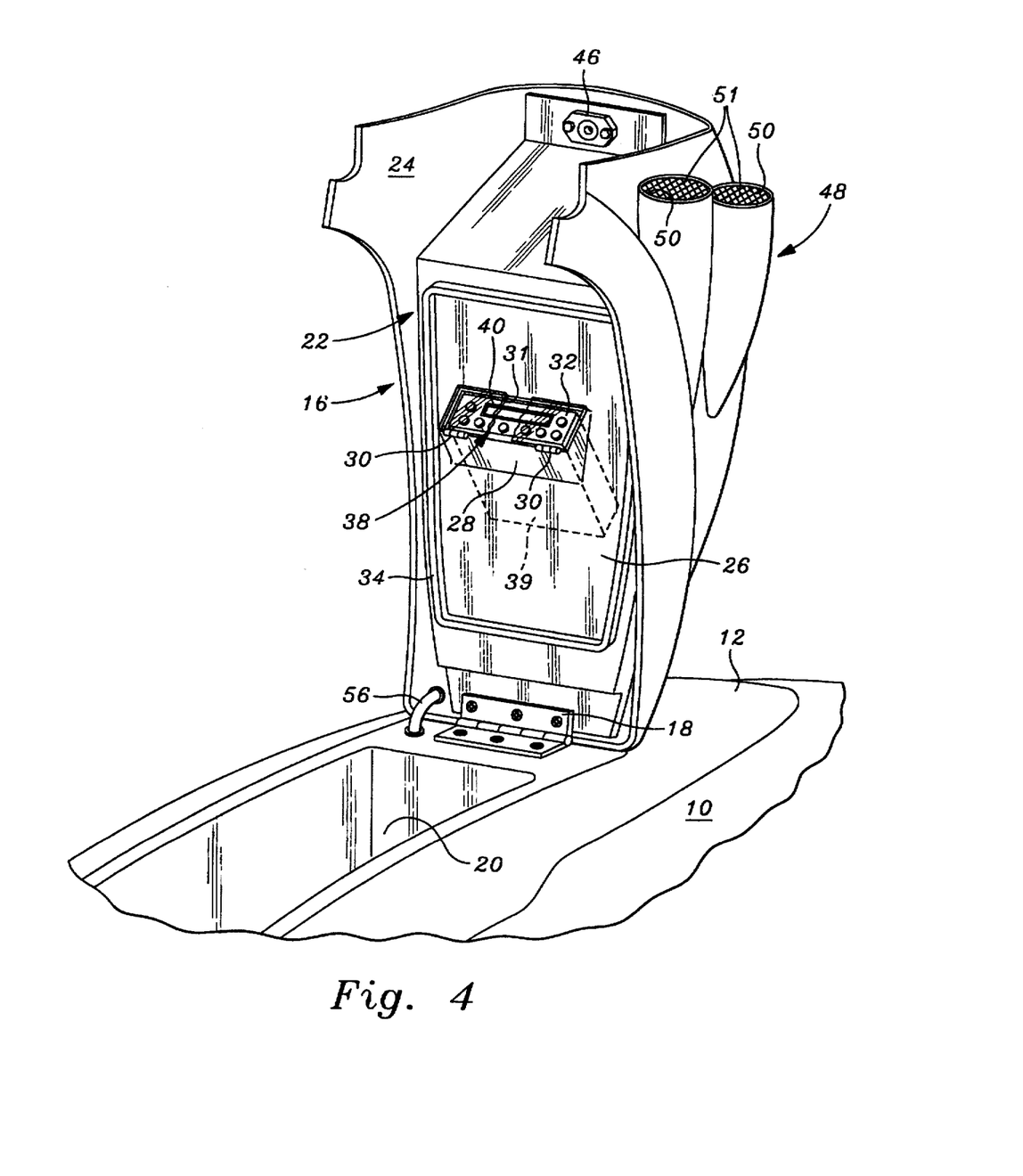
FIG. 4 is a fragmentary perspective view showing the forward portion of the PWC hull with the hood assembly disposed in its fully open position.
Figure 5:
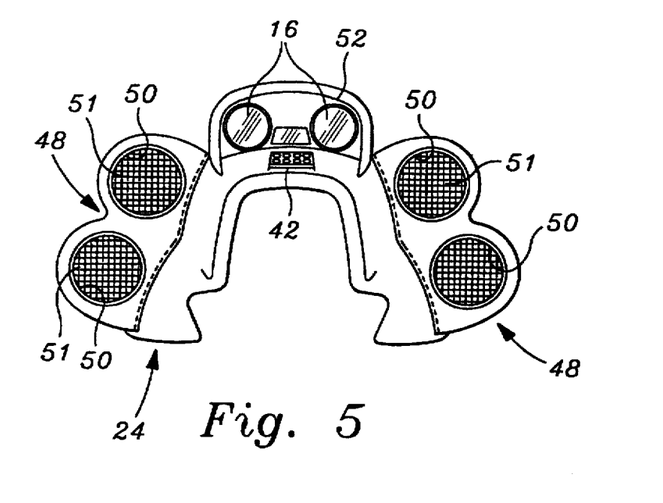
FIG. 5 is a rear elevational view of the hood assembly depicted in the foregoing figures.
Figure 6:
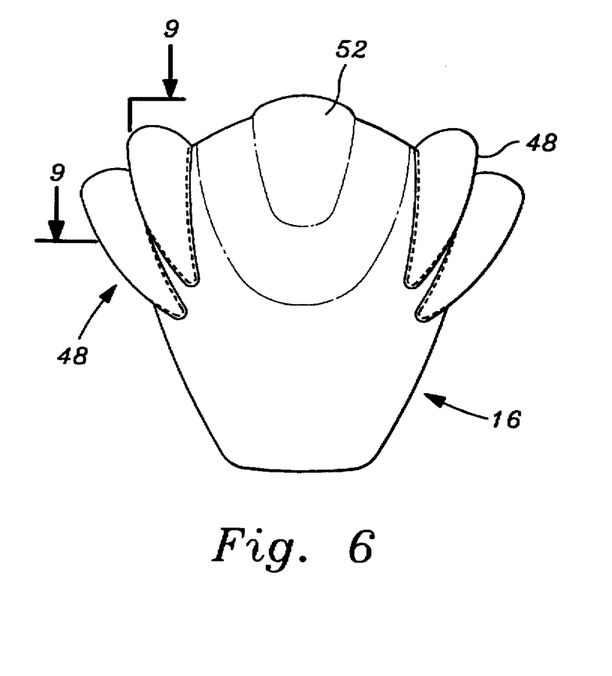
FIG. 6 is a front perspective view of the hood assembly.
Figure 11:
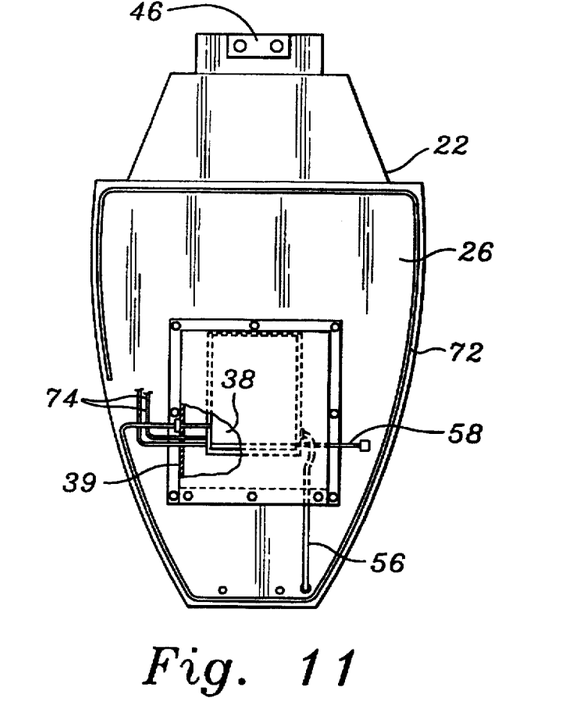
FIG. 11 is a top plan view of the inner base piece of which the hood assembly is comprised, a portion of the audio component-supporting structure being broken away.

The hood assembly 16 comprises an inner base piece and a shell piece, generally designated respectively by the numerals 22 and 24 and joined by nut and bolt fasteners 25. As is best seen in FIGS. 3, 4, and 11, the base piece 22 provides structure in which the electronic component of an audio system is supported. Specifically, the panel 26 of the base piece 22 is formed with a forwardly inclined bottom wall portion 28 and a forwardly adjacent pedestal portion 29. A standard automotive type radio sleeve 39 is affixed by fastener and flange elements 15 and 17, which are in turn engaged respectively in forwarded and rearward wall portions 19 and 21, the latter having a rectangular opening 31 therein for that purpose. A four-sided box-like cover, general designated by the numeral 23 (which is open at the bottom and at the front, the latter to accommodate the pedestal portion 29), is secured by fasteners 25 to the panel 26 so as to form a water-tight enclosure 27 therewith. A door 32 is mounted on the rearward wall portion 21 by hinges 30 for movement between open and closed positions, displaced from and disposed over the entrance to the opening 31, respectively, and a surrounding gasket 33 seals the enclosure 27 when the door 32 is in closed position (which position is secured by snap-fit fastening elements, not shown).

The audio component, generally designated by the numeral 38, includes a housing of parallelepiped form and having a function face 40 at one end, on which face conventional operating elements, such as controls, an audio disk- or cartridge-insertion port, and the like, are presented. Although all of the details of mounting and wiring are not shown, it will be appreciated that they are such as to enable facile disconnection and removal of the electronic component 38 from the sleeve 39, for security purposes, and ready replacement and reconnection thereof.

Figures 8, 9, 10:
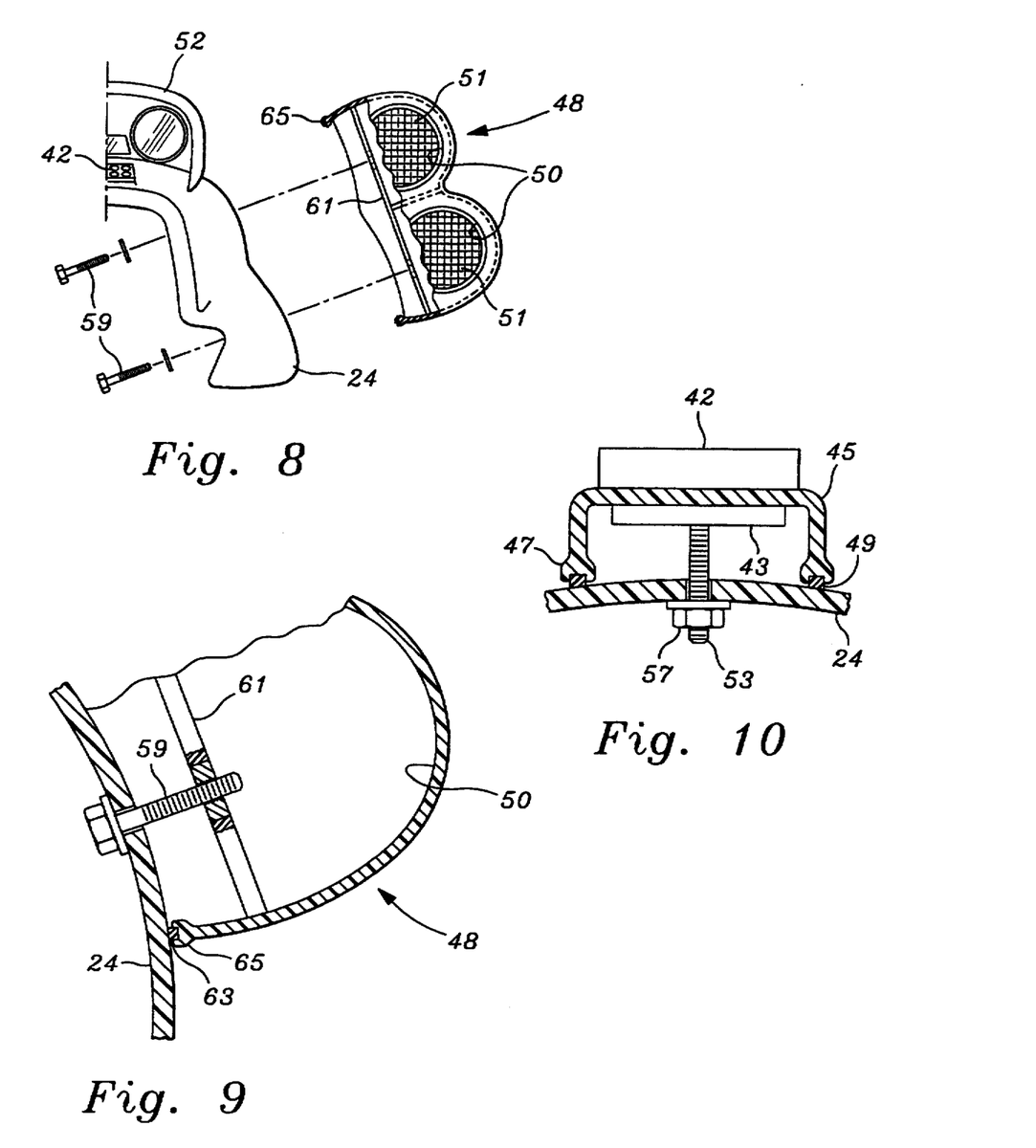
FIG. 8 is a fragmentary, exploded rear elevational view of the hood assembly.
FIG. 9 is a fragmentary sectional view of the hood assembly, taken generally along line 9—9 of FIG. 6 and drawn to a greatly enlarged scale.
FIG. 10 is a sectional view of the remote component of the audio system, and its mounting structure, taken along line 10—10 of FIG. 2 and drawn to a greatly enlarged scale.

A watertight, hard-wired remote component 42, positioned on the rearward portion of the hood assembly 16, is operatively connected to enable control of the audio system while the PWC is in operation. As is best seen in FIG. 10, the remote component 42 has a lower portion 43 of reduced cross section, which portion protrudes through a corresponding opening (not seen) in the mounting piece 45, the latter being of rectangular cross section and having a flared bottom peripheral edge portion 47 with a channel in which a sealing gasket 49 is seated. A threaded stud 53 projects downwardly from the component 42 and extends through an aperture 55 in the wall of the hood assembly shell piece 24; it is engaged by nut 57 to secure the remote component 42 and mounting piece 45 in water-tight relationship against the surface of the shell piece 24.

Figure 1:
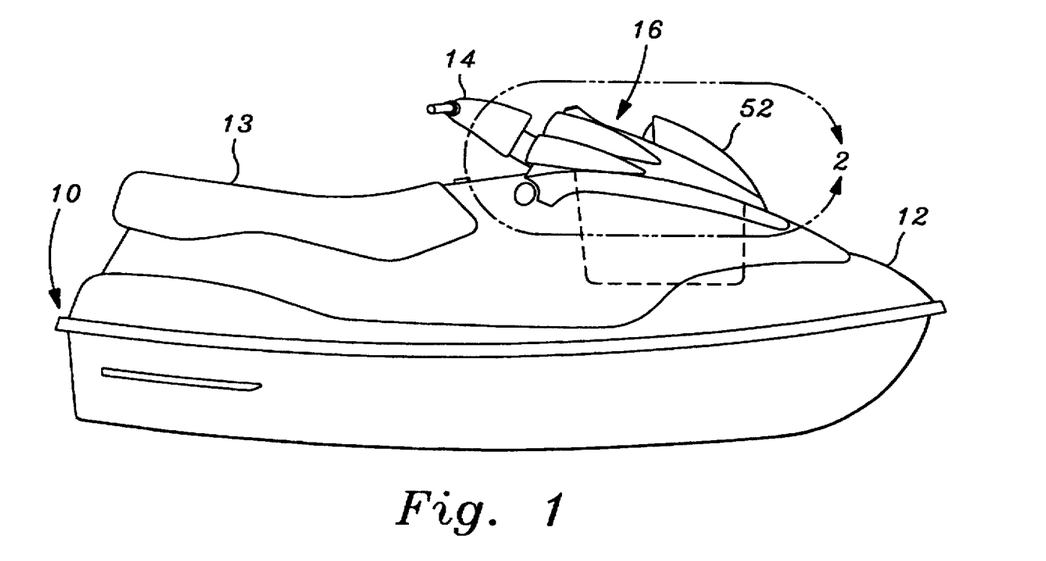
FIG. 1 is a side elevational view of a PWC into which a hood assembly embodying the present invention is incorporated.
Figure 2:
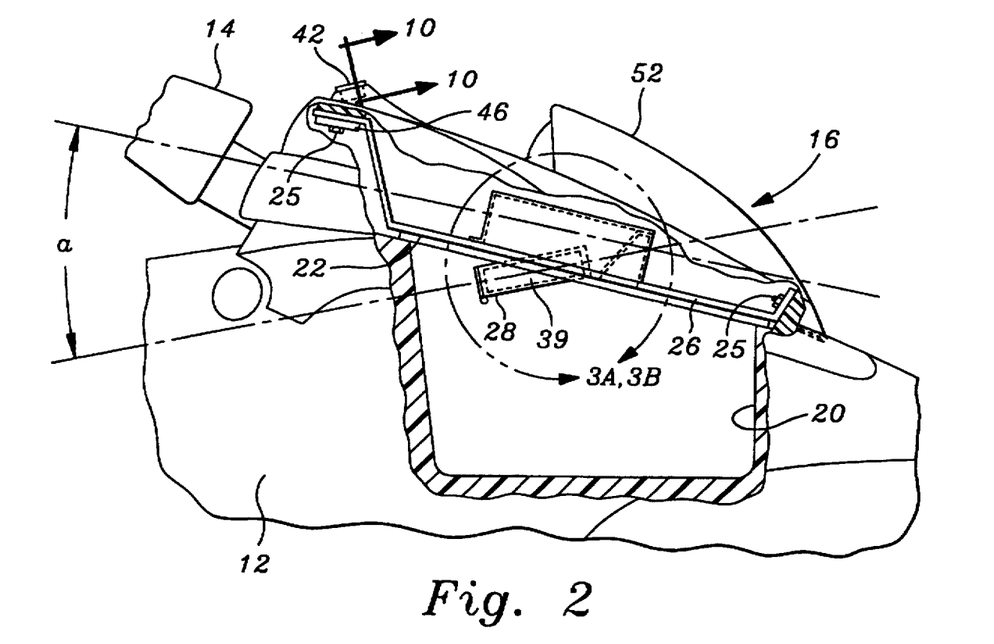
FIG. 2 is a fragmentary side elevational view of the PWC, taken generally along line 2, drawn to an enlarged scale, and having portions broken away to show internal features.

With the hood assembly 16 in its fully elevated position (as in FIG. 4), the function face 40 of the audio component 38 is directed rearwardly for ready access from the rider's location. With the hood unit 16 lowered (as in FIGS. 1 through 3), the function face 40 is directed downwardly into the compartment 20. Taken on an axis normal to the plane of the face 40, the audio component is oriented at an oblique angle "a" (see FIG. 2) typically having a value of about 20° to 40° to a longitudinal axis extending generally through the hood assembly (and parallel to the plane of the panel 26).

As is best seen in FIGS. 5, 6, 8, and 9, attached to the outer shell piece 24 of the hood 16 are two speaker mounts, generally designated by the numeral 48, each of which defines two chambers 50 containing loudspeakers 51. As shown in FIG. 9, a pair of bolts 59 are threadably engaged in apertures formed through an inside wall 61 of the speaker mount 48 to secure it to the shell piece 24, and a gasket 63, seated within a channel formed into the flared peripheral edge 65 of the mount 48, is interposed against the surface of the shell piece 24 to seal the joint against the entry of water. A gage cover hood section 52 is integrally formed into the outer shell piece 24, and serves to shelter the PWC operating gages 54.

Figure 7:
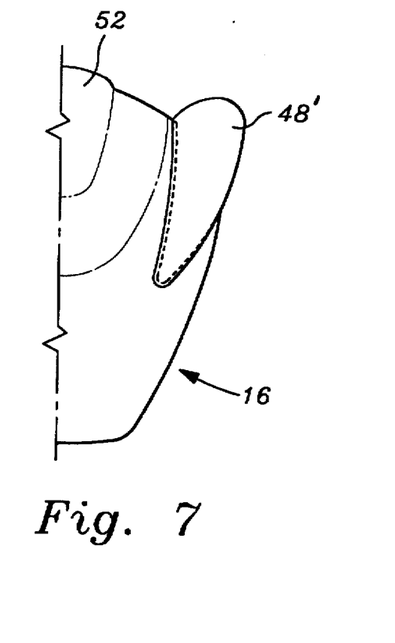
FIG. 7 is a similar view showing half of an alternative form of hood assembly.

In some instances, the hood of the PWS will not be well suited for mounting of four speakers. FIG. 7 depicts a PWC hood on which only one speaker mount 48' is provided on each side of the hood assembly.

Figure 12:
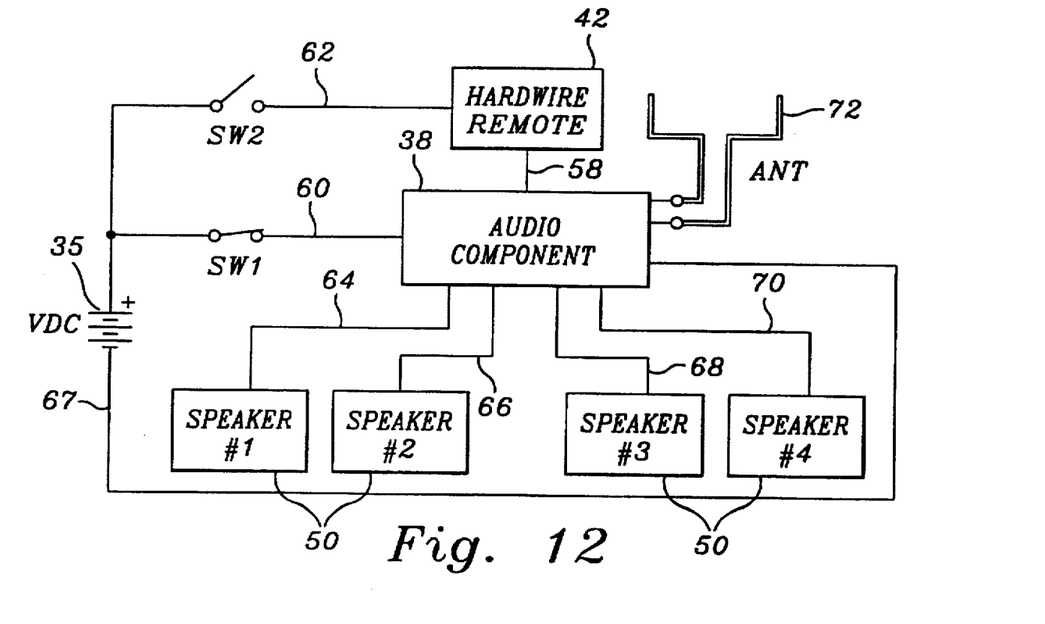
FIG. 12 is a wiring diagram for the audio system of the PWC.

Wiring for the audio system is shown diagrammatically in FIG. 12. The audio component 38 is connected to the hardwired remote component 42 by wire 58, and each is in turn connected, by wires 60 and 62, through internal switches SW1 and SW2, to the PWC power supply 35 "VDC" by way of a common wire 67. In the configuration depicted the remote component 42 is conditioned to control power to the system through switch SW2; opening of SW1 would disable the remote component and turn the system off. The loudspeakers 50 on one side of the craft, designated SPEAKER #1 and SPEAKER #2, are connected by wires 64 and 66 to the audio component 38, and the loudspeakers 50 on the opposite side, designated SPEAKER #3 and SPEAKER #4, are similarly connected by wires 68 and 70. The speaker wires are contained in a conduit 74, and the power supply wires 60, 62, and 67 extend through conduit 56. A radio signal antenna 72, designated ANT in FIG. 12, is operatively connected to the audio component 38 and circumscribes the panel 26.

Thus, it can be seen that the present invention provides means by which an audio system, and in particular a stereo system, can be installed effectively and conveniently into a personal watercraft. More specifically a hood assembly, comprised of a novel internal base piece, is provided for the containment of an audio system on-board a PWC. The assembly, and in particular the internal base piece, provides a waterproof environment for the audio system while enabling easy access to the operating controls and functional elements of the audio system and affording optimal positioning of the loudspeakers; the hood assembly maintains the aesthetic attributes of the unmodified PWC front hood.

Having thus described the invention, what is claimed is:

1. A hood assembly for a personal watercraft, which watercraft comprises a hull having a rider's location and an upwardly opening storage compartment disposed forwardly thereof; said hood assembly having an outside and an underside, and having forward and rearward end portions and a longitudinal axis extending generally therebetween, and being constructed for attachment to such a watercraft hull with said rearward end portion of said hood assembly proximate the rider's location, for movement between a lowered position, in a closing relationship overlying the hull compartment, and a raised position spaced upwardly away from the compartment, said hood assembly also having underlying structure for supporting an electronic audio component of an on-board audio system in position to lie in communication with the storage compartment of the hull with said hood assembly so attached and in its lowered position, said underlying structure being so constructed as to orient a supported audio component with a function face thereof directed toward the rider's location, for ready access to the rider, with said hood assembly so attached and in its open position.

2. The hood assembly of claim 1 wherein said underlying structure orients a supported audio component with its function face directed into the storage compartment of the hull in said lowered hood assembly position, and directed generally rearwardly toward the rider's location in said raised hood assembly position.

3. The hood assembly of claim 2 wherein said underlying structure is such that an axis of a supported audio component lying generally normal to its function face extends at an oblique angle to said longitudinal axis of said hood assembly.

4. The hood assembly of claim 2 wherein said underlying structure is such that a supported audio component is positioned at least partially within the storage compartment in the lowered position of said hood assembly.

5. The hood assembly of claim 1 wherein said hood assembly includes a remote control component constructed for operative connection to the supported audio component and disposed on said rearward end portion of said hood assembly for ready access to the rider with said hood assembly in said lowered position.

6. The hood assembly of claim 5 wherein said hood assembly comprises an outer shell piece and an inner base piece, said inner base piece providing said underlying structure.

7. The hood assembly of claim 6 wherein said inner base piece provides a water-tight environment for a supported audio component.

8. The hood assembly of claim 1 wherein said hood assembly additionally includes at least one speaker mount on said rearward end portion.

9. The hood assembly of claim 7 wherein said hood assembly comprises an outer shell piece on which said speaker mount is disposed.

10. A personal watercraft comprising: a hull having a rider's location, and an upwardly opening storage compartment disposed forwardly thereof; a hood assembly having an outside and an underside, and having forward and rearward end portions and a longitudinal axis extending generally therebetween; means for attaching said hood assembly to said hull with said rearward end portion of said hood assembly proximate said rider's location, for movement between a lowered position, in a closing relationship overlying said compartment, and a raised position spaced upwardly away from said compartment; an on-board audio system including at least one electronic audio component having a function face with operating elements thereon, and at least one loudspeaker operatively connected to said audio component; and underlying structure for supporting said audio component on said underside of said hood assembly in position to lie in communication with said storage compartment with said hood assembly in said lowered position, said underlying structure orienting said audio component with said function face directed toward said rider's location, for ready access to the rider, with said hood assembly in said raised position.

11. The watercraft of claim 10 wherein said means for attaching comprises a hinge attached to said forward end portion of said hood assembly, and wherein said underlying structure orients said audio component with said function face directed into said storage compartment, in said lowered hood assembly position, and directed generally rearwardly toward said rider's location in said raised hood assembly position.

12. The watercraft of claim 11 wherein said underlying structure is such that an axis of said audio component lying generally normal to said function face extends at an oblique angle to said longitudinal axis of said hood assembly.

13. The watercraft of claim 11 wherein said underlying structure is such that said audio component is positioned at least partially within said storage compartment in the lowered position of said hood assembly.

14. The watercraft of claim 10 wherein said audio system additionally includes a remote control component operatively connected to said audio component and disposed on said rearward end portion of said hood assembly for ready access to the rider with said hood assembly in said lowered position.

15. The watercraft of claim 10 wherein said hood assembly comprises an outer shell piece and an inner base piece, said inner base piece providing said underlying structure and said underlying structure in turn providing a water-tight environment for said audio component.

16. The watercraft of claim 10 wherein said hood assembly additionally includes at least one speaker mount for mounting said at least one loudspeaker on said rearward end portion, and wherein said hood assembly comprises an outer shell piece on which said speaker mount is disposed.

17. The watercraft of claim 16 wherein said audio system comprises at least two loudspeakers operatively connected to said electronic component, and wherein said hood assembly includes at least a second said speaker mount on said rearward end portion, said one and second speaker mounts being disposed on opposite lateral sides of said hood assembly and each of said speaker mounts mounting at least one of said loudspeakers.

18. An inner base piece constructed for assembly with a shell piece to provide a hood assembly for a personal watercraft, which watercraft comprises a hull having a rider's location and an upwardly opening storage compartment disposed forwardly thereof, and which hood assembly has forward and rearward end portions, and a longitudinal axis extending generally therebetween, and is constructed for attachment to such a watercraft hull with the rearward end portion of the hood unit proximate the rider's location, for movement between a lowered position, in a closing relationship overlying the hull compartment, and a raised position spaced upwardly away from the compartment, said inner base piece including structure for supporting an electronic audio component of an on-board audio system on the underside of the hood assembly, in position to lie in communication with the storage compartment of the hull with said inner base piece incorporated into such a hood assembly and with the hood assembly so attached and in its lowered position, said structure for supporting being so constructed as to orient a supported audio component with a function face thereof directed toward the rider's location, for ready access to the rider, with the incorporating hood assembly so attached and in its open position.

19. The inner base piece of claim 18 wherein said structure for supporting provides a water-tight environment for a supported audio component.

20. The inner base piece of claim 18 wherein said structure for supporting orients a supported audio component with its function face directed into the storage compartment of the hull, in the lowered position of a hood assembly incorporating said inner base piece, and directed generally rearwardly toward the rider's location in the raised hood assembly position.

* * * * *